United States Patent Office 3,696,084
Patented Oct. 3, 1972

3,696,084
PROCESS FOR REPLACING CHLORIDE GROUPS IN POLYVINYL CHLORIDE
Ronnie D. Gordon, Ponca City, Okla., assignor to Continental Oil Company, Ponca City, Okla.
No Drawing. Filed Sept. 17, 1970, Ser. No. 73,249
Int. Cl. C08f 27/06, 27/08, 3/30
U.S. Cl. 260—79.3 R          9 Claims

ABSTRACT OF THE DISCLOSURE

A portion of the chloride ions in polyvinyl chloride is replaced by a different nucleophylic functional group by heating the polyvinyl chloride polymer and a material containing the replacing functional group in the presence of a quaternary phosphonium or arsonium salt catalyst at a temperature of from about 25° C. to about 200° C., with or without a solvent, for a period from about two hours to about forty-eight hours.

BACKGROUND OF THE INVENTION

(1) Field of the invention

This invention relates to the preparation of organic polymeric materials, and more particularly, to the preparation of polymeric derivatives of polyvinyl chloride in which a portion of the chloride content of the polymer has been selectively replaced by other functional groups.

(2) Brief description of prior art

It is known to replace at least a portion of the chloride functional groups in polyvinyl chloride in order to produce polymeric materials having properties differing in some respects from the properties of unmodified polyvinyl chloride. Thus, in Hwa U.S. Patent 3,380,973, a process is disclosed in which particulate solid polyvinyl chloride is reacted with a metal trithiocarbonate salt in the presence of a surfactant, such as a quaternary ammonium salt. A trithiocarbonated polyvinyl chloride product is yielded which contains about 1 weight percent sulfur. The reaction is preferably carried out at a temperature of from about 73° C. to about 80° C.

SUMMARY OF THE PRESENT INVENTION

It is proposed by the present invention to provide a process for replacing a portion of the chloride ions in polyvinyl chloride by a different nucleophylic group to obtain polymers characterized by properties differing from the properties of polyvinyl chloride. Broadly described, the process utilized for the purpose of effecting the described replacement comprises heating the polyvinyl chloride polymer and a material containing the replacing functional group in the presence of a quaternary phosphonium or arsonium salt at a temperature of from about 25° C. to about 200° C. A solvent for the polyvinyl chloride may or may not be utilized.

It is found that the use of the phosphonium and arsonium salts offers advantages over the use of quaternary ammonium compounds in treating the polyvinyl chloride to replace a portion of the chloride ions, in that the former salts are more temperature stable than the quaternary ammonium compounds, thus permitting the reaction to be carried out at higher temperatures, and further in that a higher degree of chloride replacement is possible when using the phosphonium and arsonium salts than when an ammonium compound is employed.

From the foregoing description, it will have become apparent that an important object of the invention is to provide a process for modifying polyvinyl chloride polymer to selectively alter the appearance, structure and physical and chemical properties of the polymer by selectively replacing a portion of the chloride ions of the polymer with other functional groups.

Another and more specific object of the invention is to increase the fraction of the total chloride content of the polyvinyl chloride which can be replaced by other selected functional groups by a process of catalytic metathetical substitution.

Another object of the invention is to provide an improvement in previously known processes of metathetically substituting other functional groups for the chloride ions in polyvinyl chloride, whereby the substitution can be carried out at higher temperatures.

Other objects and advantages will become apparent as the following detailed description of the invention is considered.

DETAILED DESCRIPTION OF PREFERRED EMBODIMENTS OF THE INVENTION

It has been known to modify the properties of polyvinyl chloride and other polymers by copolymerization with differing polymers, and more recently, trithiocarbonation of polyvinyl chloride has been effected by metathetical substitution of the chloride ions of the polymer. The polyvinyl chloride resin is thereby upgraded, and the modified polymer is characterized in having an elevated softening point and increased stability. Some undesirable limitations exist, however, upon the extent to which the chloride ions of the polyvinyl chloride can be replaced in producing the trithiocarbonated polyvinyl chloride, and in the temperatures at which the substitution reaction can be carried out.

The process of the present invention permits a number of different functional groups to be incorporated into the polyvinyl chloride molecule in place of the chloride ion, and the extent of possible replacement is relatively great. The invention therefore facilitates considerable selectivity in the manner and extent to which the properties of the polyvinyl chloride are altered. Moreover, the process can be carried out at temperatures extending up to the decomposition temperature of the polyvinyl chloride (about 200° C.), and thus the replacement can be carried out more expeditiously, and with the desirable reaction condition of more complete and effective solution of the polyvinyl chloride in selected solvents.

The polyvinyl chloride employed in the reaction can be in several physical forms, and of widely varying molecular weight. Preferably, however, the polyvinyl chloride used in the reaction is in particulate form with the particles having a size of from about 0.01 micron to about 500 microns, and the polymer having a molecular weight exceeding about 5000. The reaction is preferably carried out with the polyvinyl chloride dissolved in a suitable inert organic solvent, but the use of a solvent is not essential.

A wide variety of replacement functional groups can be incorporated in the polyvinyl chloride molecules in place of the chloride ions, it being only necessary that the replacing moiety be sufficiently nucleophilic to undergo the metathetical substitution. Without intending to comprehensively limit such replacing functional groups, tosylate, bromide, iodide, cyanide, and trithiocarbonate ions may be mentioned as typical examples.

In carrying out the reaction, the polyvinyl chloride (with or without solution in a suitable solvent) and a compound constituting the source of the replacing functional group are heated in the presence of a catalytic material selected from the group consisting of quaternary phosphonium salts and quaternary arsonium salts. The phosphonium salts constitute the more active catalyst and are therefore preferred, although under some reaction conditions, the better temperature stability of the arsonium salts makes their use more desirable.

The amount of the compound containing the replacing functional group which is used will, of course, depend upon the extent of chloride replacement which is desired. The amount of the phosphonium or arsonium salt catalyst utilized can vary from about 0.01 weight percent to about 10 weight percent (based on the weight of the reactants), and preferably is from about 0.1 weight percent to about 5.0 weight percent.

The temperature at which the reaction is carried out may vary widely from about 20° C. to about 200° C., but preferably is in the range of from about 80° C. to about 150° C. The time over which the reaction is allowed to proceed is subject to considerable variation, and is, of course, dependent to a large extent upon the degree of chloride replacement sought, the temperature to which the reaction mixture is heated, and the amount of catalyst present. In general, however, a reaction time of from about two hours to about forty-eight hours is used in most instances.

The following examples will serve to further illustrate the principles of the invention by providing examples of the actual performance of the process under typical, but non-limiting, conditions.

Example 1.—50 grams of particulate polyvinyl chloride were dissolved in 150 ml. of benzene and placed in a flask equipped with a reflux condenser. 20 grams of ethyl tosylate and 0.5 gram of tributyl octadecyl phosphonium bromide were added to the flask, and the mixture was heated to reflux for forty-eight hours. After refluxing, the solvent was evaporated and the polymer remaining was washed with methanol and dried overnight at 60° C. X-ray analysis of the polymeric product showed that this material contained 44 percent by weight chloride. Unmodified polyvinyl chloride contains 56 percent by weight chloride, thus demonstrating a replacement of 12 percent of the total chloride present by the carrying out of the reaction. The tosylate group in the modified polyvinyl chloride was hydrolized to the alcohol, and this moiety then detected by infrared analysis to confirm the extent of replacement.

Example 2.—5.0 grams of polyvinyl chloride, 10.9 grams of ethyl bromide, 100 ml. of benzene, and 0.5 gram of tributyl octadecyl phosphonium bromide were placed in a 250 ml. autoclave and heated at 110° C. overnight. The solvent was evaporated to yield a dark polymer which was washed with methanol and dried overnight in a vacuum oven at 62° C. X-ray analysis of the polymer product showed that 11 percent of the total original chloride content of the polyvinyl chloride had been replaced by bromide.

Example 3.—Other runs were carried out under reaction conditions similar to those described in Example 2 except that the chloride in the polyvinyl chloride polymer was replaced by iodide and cyanide ions. In the metathetical substitutions involved, 8 percent of the chloride was found to be replaced by iodide, and 13 percent of the chloride content of the original polymer was replaced by cyanide.

From the foregoing description of the invention and the actual working examples set forth, it will be apparent that the invention provides an effective process for replacing a significant portion of the chloride ions in polyvinyl chloride polymer with other selected ions so that the properties of the polymer may be altered in a controlled manner. Although certain preferred process conditions and especially suitable reactants have been herein disclosed and specific reference made thereto, it is to be understood that variations in the described conditions and reactants can be effected without departure from the basic principles of the invention. Changes and innovations of this type are therefore deemed to be circumscribed by the spirit and scope of the invention except as the same may be necessarily limited by the appended claims or reasonable equivalents thereof.

What is claimed is:

1. A process for replacing chloride ions in polyvinyl chloride with other functional groups by metathetical substitution which comprises heating the polyvinyl chloride to a temperature of from about 25° C. to about 200° C. with a material containing the replacing functional group in the presence of a catalyst present in an amount of from about 0.01 weight percent to about 10 weight percent based on the weight of the reactants, and selected from the group consisting of a quaternary phosphonium salt and a quaternary aronsium salt.

2. The process defined in claim 1 wherein said replacing functional group is selected from the larger group consisting of tosylate ion, bromide ion, iodide ion, cyanide ion and trithiocarbonate ion.

3. The process defined in claim 1 wherein said catalyst is a quaternary phosphonium salt.

4. The process defined in claim 1 wherein the polyvinyl chloride and said material are heated to a temperature of from about 80° to about 150° C.

5. The process defined in claim 2 wherein said catalyst is tributyl octadecyl phosphonium bromide.

6. The process defined in claim 1 wherein the amount of catalyst utilized is from about 0.1 weight percent to about 5.0 weight percent.

7. The process defined in claim 4 wherein the heating is continued for from about two hours to about forty-eight hours.

8. The process defined in claim 7 wherein said catalyst is a quaternary phosphonium salt.

9. The process defined in claim 8 wherein said catalyst is a tetraalkyl phosphonium halide compound in which the alkyl substituents collectively contain at least 30 carbon atoms.

References Cited

UNITED STATES PATENTS 3,380,973    4/962    Hwa _____ 260—92.8 A

JAMES A. SEIDLECK, Primary Examiner

J. A. DONAHUE, Jr., Assistant Examiner

U.S. Cl. X.R.

260—79.5 NV, 92.8 A